United States Patent
Tsai et al.

(10) Patent No.: US 11,636,658 B1
(45) Date of Patent: Apr. 25, 2023

(54) DYNAMIC AUGMENTED REALITY OVERLAY DISPLAY

(71) Applicant: Google LLC, Mountain View, CA (US)

(72) Inventors: Yi-Hsuan Tsai, Santa Clara, CA (US); Chen-Ping Yu, Cupertino, CA (US); Myvictor Tran, Vancouver (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/736,978

(22) Filed: May 4, 2022

(51) Int. Cl.
| | | |
|---|---|---|
| G06T 19/00 | (2011.01) | |
| G06T 7/50 | (2017.01) | |
| G06T 7/70 | (2017.01) | |
| G06T 7/10 | (2017.01) | |
| G06V 10/82 | (2022.01) | |
| G06V 20/70 | (2022.01) | |

(52) U.S. Cl.
CPC ............. *G06T 19/006* (2013.01); *G06T 7/10* (2017.01); *G06T 7/50* (2017.01); *G06T 7/70* (2017.01); *G06V 10/82* (2022.01); *G06V 20/70* (2022.01); *G06T 2207/10016* (2013.01); *G06T 2207/20084* (2013.01)

(58) Field of Classification Search
CPC ........... G06T 19/006; G06T 7/10; G06T 7/50; G06T 7/70; G06V 20/70; G06V 10/82
USPC ....................................................... 345/633
See application file for complete search history.

(56) References Cited

U.S. PATENT DOCUMENTS

| | | | |
|---|---|---|---|
| 2018/0089895 A1* | 3/2018 | Anderson | G06F 3/00 |
| 2020/0402296 A1* | 12/2020 | Rosmeulen | G06T 15/503 |
| 2021/0287385 A1* | 9/2021 | Watson | G06N 20/00 |

* cited by examiner

*Primary Examiner* — Hai Tao Sun
(74) *Attorney, Agent, or Firm* — Shumaker & Sieffert, P.A.

(57) ABSTRACT

Three-dimensional occlusion can be used when generating AR display overlays. Depth information can be used to delete portions of an AR element, based on intervening objects between a viewer and the AR element. In cases where the depth information does not impart a complete picture of the intervening objects, additional image processing and object detection systems and techniques can be used to further improve the precision of the occlusion.

15 Claims, 11 Drawing Sheets

DYNAMIC AUGMENTED REALITY OVERLAY DISPLAY

BACKGROUND

Field

This application relates to the field of artificial intelligence, and more particularly to the field of generating display overlays, using artificial intelligence techniques.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Augmented reality can be used to provide a visual overlay display on a video feed of an environment. A wealth of information can be conveyed in this manner and provide an enhanced user experience. For example, the user can be presented with a video feed of an environment in the real world, where multiple augmented reality icons and indicators are overlayed on the video feed to enhance the user's experience of the environment portrayed in the video feed. Navigation guidance, points of interest icons, and text strings can let the user know where to go and what businesses and services are present in the environment. The placement of AR elements in an image can be done with consideration of where the element is in relation to the vantage point of a user. In some applications, AR elements can be partially or fully obstructed, based on whether an intervening object is located between the user and the AR element, had the AR element were to exist as a physical object in the environment. This gives the user a more realistic appearance of the AR element. Existing techniques to detect intervening objects and obscure the relevant AR elements can be inaccurate and/or may resent an incomplete or inaccurate rendering of the obscured or partially obscured AR elements. As a result, there is a need for improved systems and methods to enhance placement of AR elements with more robust consideration for intervening objects.

SUMMARY

The appended claims may serve as a summary of this application.

DETAILED DESCRIPTION OF THE DRAWINGS

Figure 1:
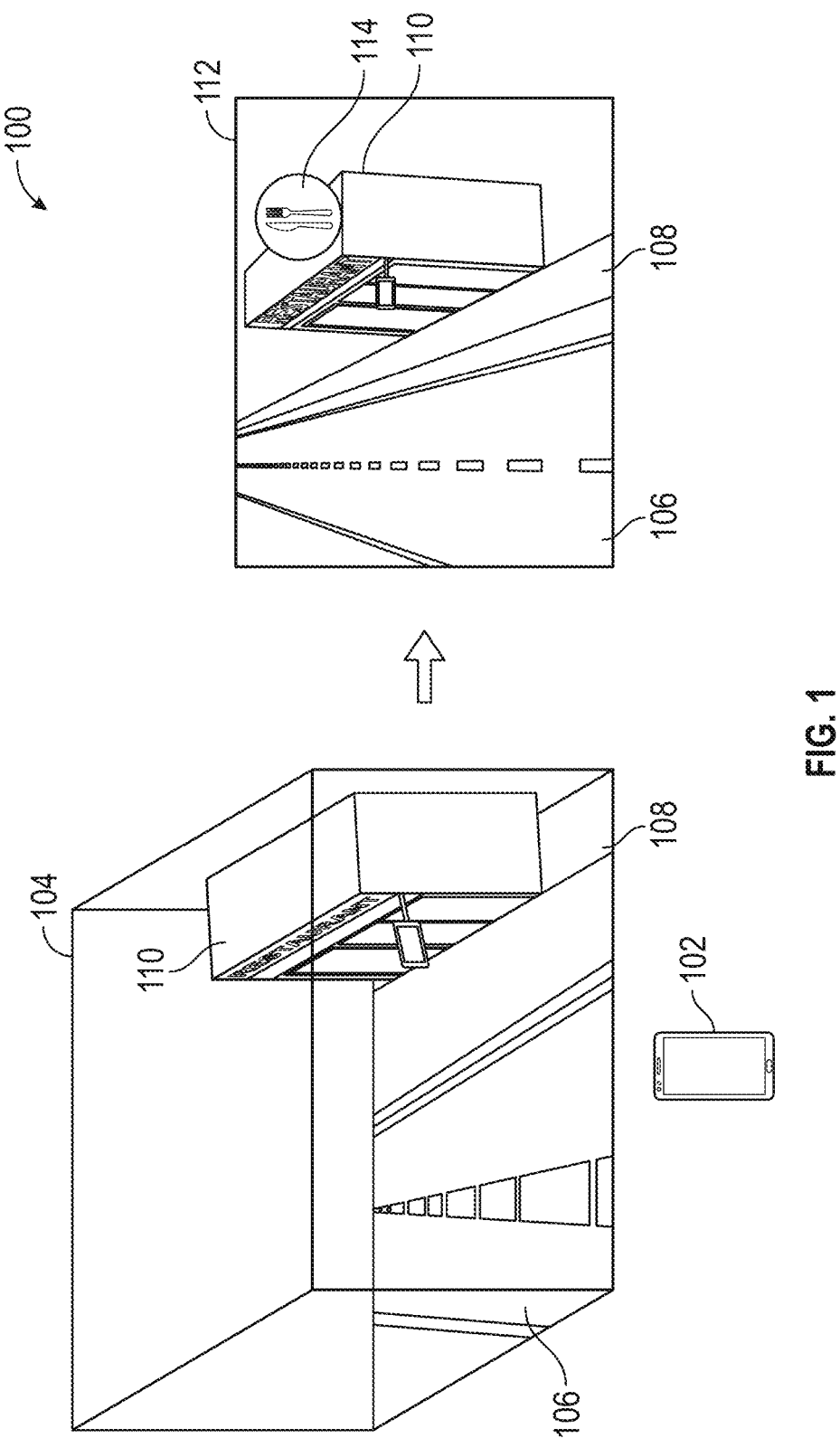
FIG. 1 illustrates a diagram of generating a two-dimensional image of an environment with an augmented reality (AR) overlay.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Overview

Augmented reality (AR) is an increasingly powerful technology to improve the effectiveness of our devices. AR overlay displays can impart a wealth of information to a user. For example, in the field of navigation, AR elements can provide a user with a video feed of a scene augmented with a variety of information, such as road navigation indications and point of interest (POI) displays. The AR elements can be in the form of graphics displayed on a live video feed displayed to the user on a mobile device. Several systems are combined to determine, placement and size of the AR elements. In some applications of the AR technology, the placement of AR elements in a scene may be accurate, but the objects in the scene are not considered when generating and placing the AR elements in the scene. For example, a POI icon of a restaurant may be correctly placed in the scene, but if the placement is done, without regard to other objects and elements in the scene, the POI icon can appear out of place and less realistic, less in the scene and potentially misleading. For example, from the vantage point of the user, the POI icon of the restaurant may need to be obstructed by objects that are in front of the POI icon and closer to the user. In these scenarios, generating the AR element can include determining depth information and selectively masking or obstructing the AR element, based on the objects that are in between the AR element and the user. For example, if from the vantage point of the user of an AR system, the POI restaurant icon is behind a traffic pole, the POI icon can be generated in a way that the portions obstructed by the traffic light pole are deleted. As a result, the POI icon appears behind the pole relative to the user, which may be closer to reality if the POI icon were a physical signpost in the environment. The same dynamic can also exist when displaying road navigation indicators, such as carpets and arrows. If a navigation indicator were to exist in the real world and a car were between the viewer and the navigation indicator, the navigation indicator would be invisible to the viewer in the portions blocked by the car. Masking or erasing portions of an AR element, based on objects between the AR element and the viewer can be referred to as three-dimensional (3D) occlusion.

A variety of systems can be used to provide 3D occlusion of AR elements. For example, depth estimators and depth maps can be used to determine relative distances of objects (in the AR world and in the real world) to an observer, user or viewer of the AR element. Depth maps can provide depth information for pixels in a two-dimensional image. If an AR element pixel is at a deeper distance, relative to the user, compared to the pixels of another object, those AR element pixels can be deleted from the AR element, when generating a display overlay of the AR element. In other words, only the pixels of the objects closer to the user may be viewed when 3D occlusion is used. In scenarios where the user (and consequently the user's vantage point) dynamically varies relative to an AR element, the 3D occlusion of the AR element is dynamically calculated, for example, in a frame-by-frame method, as a video feed of the scene is processed, and AR overlays are generated for each frame.

In some circumstances, the depth map might be imprecise and/or, it might not include enough details to determine the boundary of an intervening object, relative to the user or the precise shape of the intervening object. In these scenarios, if depth information alone is relied upon, the resulting 3D occlusion might also be less precise. For example, more or less of the AR element may be occluded than would have otherwise been appear to the user if the AR element existed in reality. Imprecise 3D occlusion can make an AR element look odd or out-of-place to a user of an AR system or give a false impression of malfunction in the AR system. To address these and similar issues, 3D occlusion systems can take advantage of object and depth information from a plurality of object and depth information system to increase the precision of 3D occlusion.

FIG. 1 illustrates a diagram 100 of generating a two-dimensional image of an environment with an AR overlay. A user device 102 can capture and display an image or video stream of an environment 104. The environment 104 is a three-dimensional environment that exists in the real world. In the example shown, the environment 104 can include a road 106, a sidewalk 108, and a restaurant 110. An AR system can receive an image of the environment 104, for example from a camera of the user device 102 and generate an image 112, which includes an AR overlay. The image 112 can be generated by projecting every point in the environment to one or more pixels in the image 112 from a vantage point, for example, from the vantage point of the user device 102. The image 112 can include an AR overlay superimposed on the image 112. The user device 102 can be implemented in a variety of devices, such as smart phones, tablets, heads-up display (HUD) devices, artificial reality glasses, projectors, or any image capturing and AR viewing device. In some embodiments, the image capturing and image displaying with an AR overlay can be implemented in a single integrated user device 102 or can be separated into a plurality of devices.

The AR overlay can include AR elements, for example, POI icons, navigation indicators, such as carpets and arrows, signals, flags, or any other graphics overlayed on the image 112 to convey information to the user. The AR elements can be referred to as virtual reality icons, elements, indicators, graphics, or similar terminology. Various systems and components of an AR system help generate the AR overlay of the image 112. For example, in some embodiments, global positioning system or other positioning system data is used to determine the location (e.g., coordinates) of the user device 102 in the environment 104 and the location of AR elements in the overlay displayed on the image 112. The AR system may generate a three-dimensional map of the environment 104 and calculate relative distances of the user to the various points in the environment 104. The location data can be used to determine which AR elements to generate in the AR overlay of the image 112 and where to place them in the image 112. In the example shown, the AR system detects a restaurant 110 nearby the user device 102 and a restaurant icon 114 is generated in the AR overlay of the image 112. Generation and placement of the AR element can be in response to a request from the user (e.g., a navigation request) or as part of an augmented reality presentation of the environment 104. Depending on the location of the AR elements and other objects in the image 112, 3D occlusion can be used to make the appearance of the AR elements more realistic and convey information more accurately.

Figure 2:
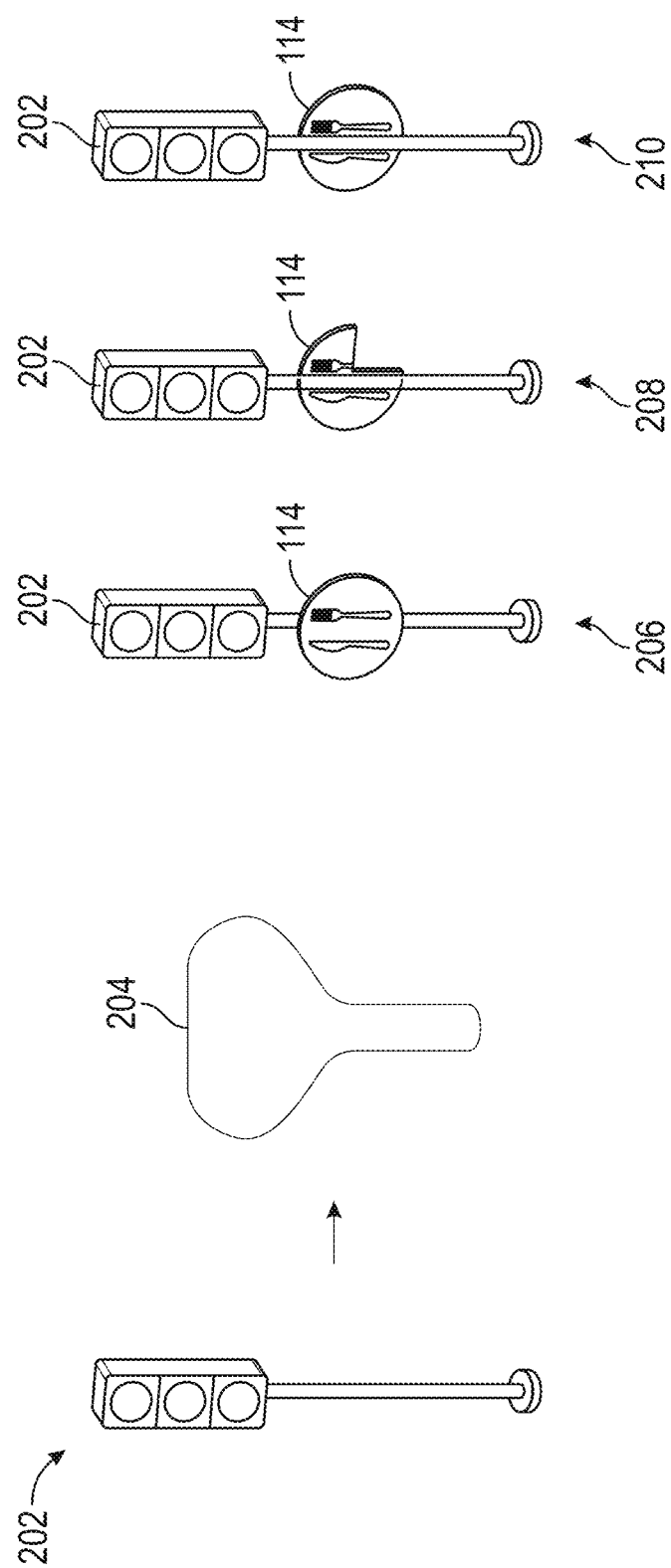
FIG. 2 illustrates an application of placement of an AR overlay in an image.

FIG. 2 illustrates an application of placement of AR elements, when various techniques are used. In a sample image, a traffic pole 202 can be an intervening object between an AR element and the user. Depth map information may calculate the relative distances, or depths of the image pixels, relative to a vantage point, such as the vantage point of a user. A variety of algorithms, techniques and/or hardware can be used to generate a depth map for an image. Examples include, using a two-camera distance measurement system, using light detection and ranging (LIDAR) systems, positioning data (e.g., GPS) and/or other methods. Depth maps can include coordinates of each pixel in the image and the depth information of every pixel. When depth information alone is used to determine the shapes of objects in the environment 104, the objects can be fuzzy and appear as blobs. In the example shown in FIG. 2, the boundaries of the intervening object, traffic pole 204, are fuzzy and imprecise. Using depth information alone the traffic pole 202 may appear as a fuzzy object 204 with imprecise boundaries. While not shown depth maps are similar to heat maps in their visual appearance if they were generated for a human observer. The boundaries of the objects are unclear. Without additional information, the object 204 can be mistaken for a tree for example. If only depth information alone is used for 3D occlusion, the occlusion may be imprecise as well.

In scenario 206, the AR element 114 (e.g., a restaurant icon) is generated, without 3D occlusion. While the AR element 114 may be correctly placed in an AR overlay, if the traffic pole 202 is an intervening object, the placement of the AR element 114 appears wrong to the user because the AR element 114 appears closer to the user than the traffic pole 202. In scenario 208, depth map is used to perform 3D occlusion on the AR element 114. The occlusion is partially accurate because the depth map provides an imprecise picture of the intervening object 202. In scenario 210, the described embodiments are utilized to perform 3D occlusion, where a more accurate picture of the object 202 is used to mask or erase the portions of the AR element 114 that are obstructed by the intervening object 114. While the example shown in scenario 210 applies the described embodiment to a POI AR element, the applications of the described embodiments are not limited to only POI AR elements. As will be understood by a person of ordinary skill in the art, the described embodiments are applicable to any AR element 114, including for example, navigation indicators, navigation arrows, navigation carpets, navigation-related or non-navigation-related AR elements, such as text elements and other graphics.

Figure 3:
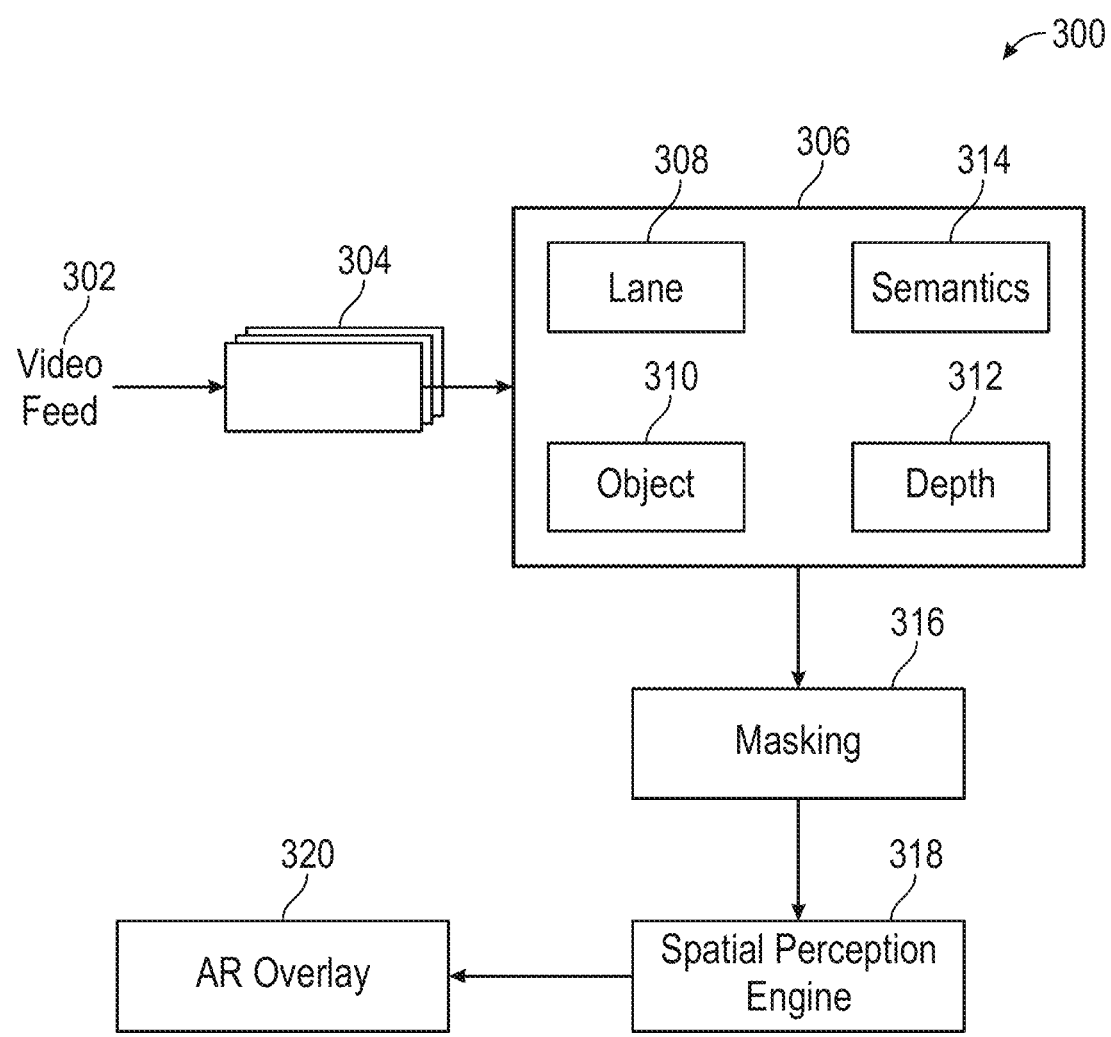
FIG. 3 illustrates an AR system, which can provide improved three-dimensional (3D) occlusion.

FIG. 3 illustrates an AR system 300, which can provide improved 3D occlusion. The AR system 300 receives a video feed 302 of an environment 104 and generates an AR overlay 320 for one or more image frames 304 The AR overlay 320 is places on an image 304 and displayed to a user. The video feed 302 can be generated by a camera device, such as a smart phone, smart glasses, tablet, on any other stand-alone or integrated camera device. The video feed 302 is made of a series of image frames 304. The image frames 304 are a projection of environment points into one or more pixels in the image frames 304. The AR system 300 can operate on the image frames 304. For example, an image processing engine 306 can receive the image frames 304 and analyze the content of the environment 104 reflected in the image frames 304. The image processing engine 306 can include a variety of image processing components. For example, a lane module 308 can detect presence and location of lanes in an image 304. The lane information can be used to place AR elements in the AR overlay 320. The image processing engine 306 can further include an object detection module 310. Object detection module 310 can use a variety of techniques to identify and tag objects in the environment 104, as reflected in an image 304. Objects can include trees, street signs, cars, pedestrians, buildings or any other objects that may appear in the environment 104. In some embodiments, the object detection module 310 can indicate objects by drawing a boundary box around the object and tagging the box with an identifier.

The image processing 306 can also include a semantics module 314, which can provide further definition, such as classification, of the objects in the image frame 304. For example, the semantics module 314 may indicate an object is a car, or a pedestrian or the ground in the image 304. The semantics module 314 can also perform segmentation of the image frame 304, for example, indicating whether the object is two distinct cars or one large car. In some embodiments, the semantics module 314 and the object detection module 310 work in conjunction to detect separation between objects. For example, some semantic segmentation techniques may lump two cars that are near one another into one segment, or classification, labeled "car," but object detection techniques may draw two distinct boxes around the two cars. In these and similar instances, the combined output of the object detection module 310 and the semantics module 314 can be used to obtain a more accurate picture of the boundaries of an object, and which pixels in the image frame 304 correspond to those object boundaries.

The components of the image processing engine 306 illustrated in FIG. 3 are provided as examples only. Fewer or more components may be present. Some components may be combined and provided as a single module. The image processing engine 306 can be implemented with a variety of artificial intelligence (AI) techniques and/or non-AI techniques. For example, neural networks, convolutional neural networks (CNNs) and other techniques may be used to implement the image processing engine 306.

The image processing engine 306 can also include a depth module 312. The depth module 312 can receive an image 304, along with other depth sensor data and/or location data and estimate a depth parameter for one or more pixels in the image frame. In some embodiments, the depth module 312 can generate a depth map of an image 304, where the pixels coordinates include a depth parameter. Depth can refer to the distance between a point in the environment corresponding to a pixel in an image frame 304 to a vantage point, such as the camera, which captured the image 304. For example, if the image frame 304 includes pixels having coordinates (x,y), the depth module 312 can produce a depth map, where pixels are indicated by a vector (x,y,d), where x and y are the coordinates of a pixel in the image frame 304 and "d" is the distance of the environment point corresponding to the pixel from the camera that captured the image frame 304.

The AR system 300 can include a masking module 316, where the information from the image processing engine 306 is used to generate a preliminary mask in the image 304, indicating where AR elements in the AR overlay 320 may need to be occluded. The masking module 316 may use object information data and depth to determine potential candidates for masking an AR element. For example, the masking module 316 can generate masks for trees, street signs, pedestrians, cards and/or other objects in the image frame 304. A spatial perception engine 318 can further refine and determine which masks from the masking module 316 are to be used to occlude AR elements in the AR overlay 320 and the boundaries of the masks. For example, the spatial perception engine 318 can determine whether an object in the image frame 304 is an intervening object between the user and an AR element in the AR overlay 320. The spatial perception engine 318 can use the masks to erase portions of the AR elements in the AR overlay 320 that are blocked by the intervening objects. In this way, the AR overlay 320 can include an improved 3D occlusion of the AR elements, which are blocked or partially blocked by intervening objects.

Figure 4:
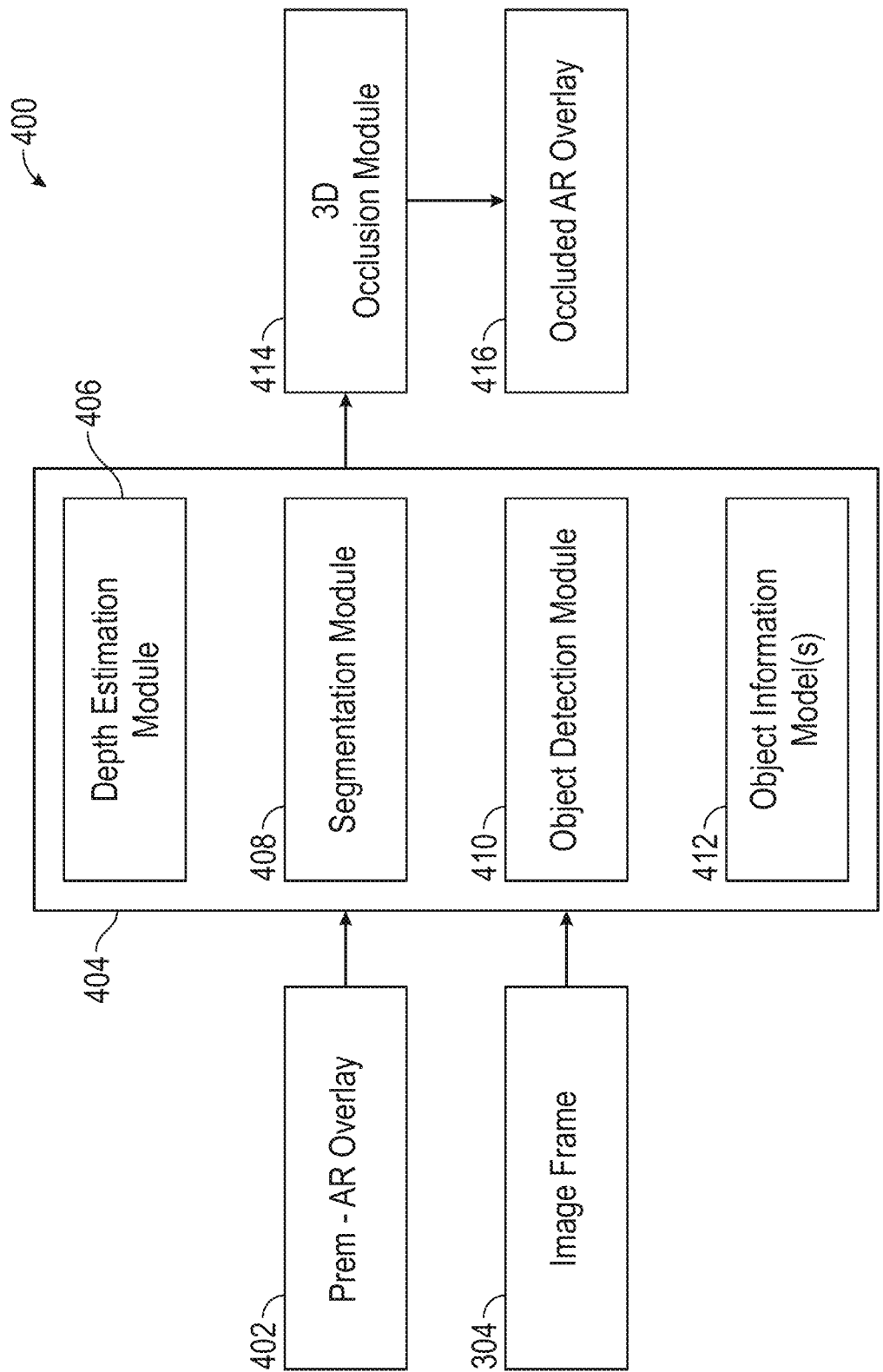
FIG. 4 illustrates a block diagram of performing 3D occlusion on an AR overlay.

FIG. 4 illustrates a block diagram 400 of performing 3D occlusion on an AR overlay. In some embodiments, a preliminary AR overlay 402 is generated. The preliminary AR overlay 402 can include an initial estimation and placement of AR elements in an image frame 304. An AR overlay enhancement (AROE) module 404 can receive the preliminary AR overlay 402 and its corresponding image frame 304 and perform a variety of operations and processes related to 3D occlusion. For example, the AROE 404 can include a depth estimation module 406, which can generate a depth map of the environment 104 reflected in the image 304. The depth map can include distances of the environment points to a user or a camera, which captured the image frame 304. The depth map can include image pixels, pixel coordinates and pixel distances of the image pixels, where pixel distances indicate the distances between environment points corresponding to the pixels to the camera which captured the image frame 304.

The AROE 404 can also include one or more object information modules, such as a segmentation module 408, an object detection module 410 and any other object information module or models 412 that provide information on the boundary, location, shape and/or outline of an object. Furthermore, the AROE 404 can determine icon location of an AR element (e.g., a virtual reality icon) in the environment 104, if the AR element were to be present in the environment as a physical object. Determining icon location of the AR element can include determining pixel coordinates of the AR element in the preliminary AR overlay 402 and/or the image frame 304. The AROE 404 can also determine icon distances of the icon pixels from the user if the AR element were present as a physical object in the environment 104.

The output of the AROE 404, including any object coordinate, boundary and pixel distances, as well the AR element's icon pixels and depth information are received by a 3D occlusion module 414. The 3D occlusion module 414 can determine intervening objects between the user an AR element in the preliminary AR overlay 402, based on the output of the AROE 404. For example, if icon pixel coordinates are in an area of the image 304, which has pixel distances closer to the user than the icon distances, the icon or AR element in that area is behind an intervening object relative to the user. The 3D occlusion module 414 can generate an occluded AR overlay 416, which is the preliminary AR overlay 402 with AR elements occluded in pixels obstructed by intervening objects.

The segmentation module 408 can use a variety of techniques, including image semantic segmentation, instance segmentation and panoptic segmentation. The segmentation module 408 can label pixels in an image frame 304 with a classification or segment label, such as a car, pedestrian, traffic signal, ground, etc. The 3D occlusion module 414 can determine the presence of an intervening object by a variety of techniques, including for example, determining image frame pixels having the same segment labels, and detecting whether same-segment-label pixels overlap any icon pixels of an AR element in the preliminary AR overlay 402. The overlapping same-segment-label pixels have distances less than the icon pixels of the AR element to the user. The intervening object pixels can be used to erase the icon pixels in the overlap areas. Alternatively, a mask can be created from the intervening object and areas of the AR element overlapping the mask can be erased when generating the occluded AR overlay 416.

In some embodiments, object data from one or more object data information models and/or modules can be combined to determine an intervening object and/or to generate an intervening object mask by which an AR element can be occluded. For example, the segmentation module 408 can perform segmentation on the image frame 304 and label image pixels with the segment label. The object detection module 410 can perform object detection, for example, by drawing box boundaries around distinct objects. The pixels within each box boundary receive an object tag. The 3D occlusion module 414 can determine same-segment-label pixels, having the same object tag, which have pixel distances less than the icon distances of an AR element in the AR overlay 402. The pixels having the same-segment-label and the same object-tag are likely from the same object in the real world or environment 104 and can be used for 3D occlusion. The icon pixels overlapping the same-segment label and same-object tag pixels can be erased when generating the occluded AR overlay 416. The occluded overlay 416 can be superimposed on the image frame 304 and displayed to a user. A plurality of image frames 304 superimposed with corresponding occluded AR overlays 416 can generate an output video stream, which can be displayed to the user.

Figure 5:
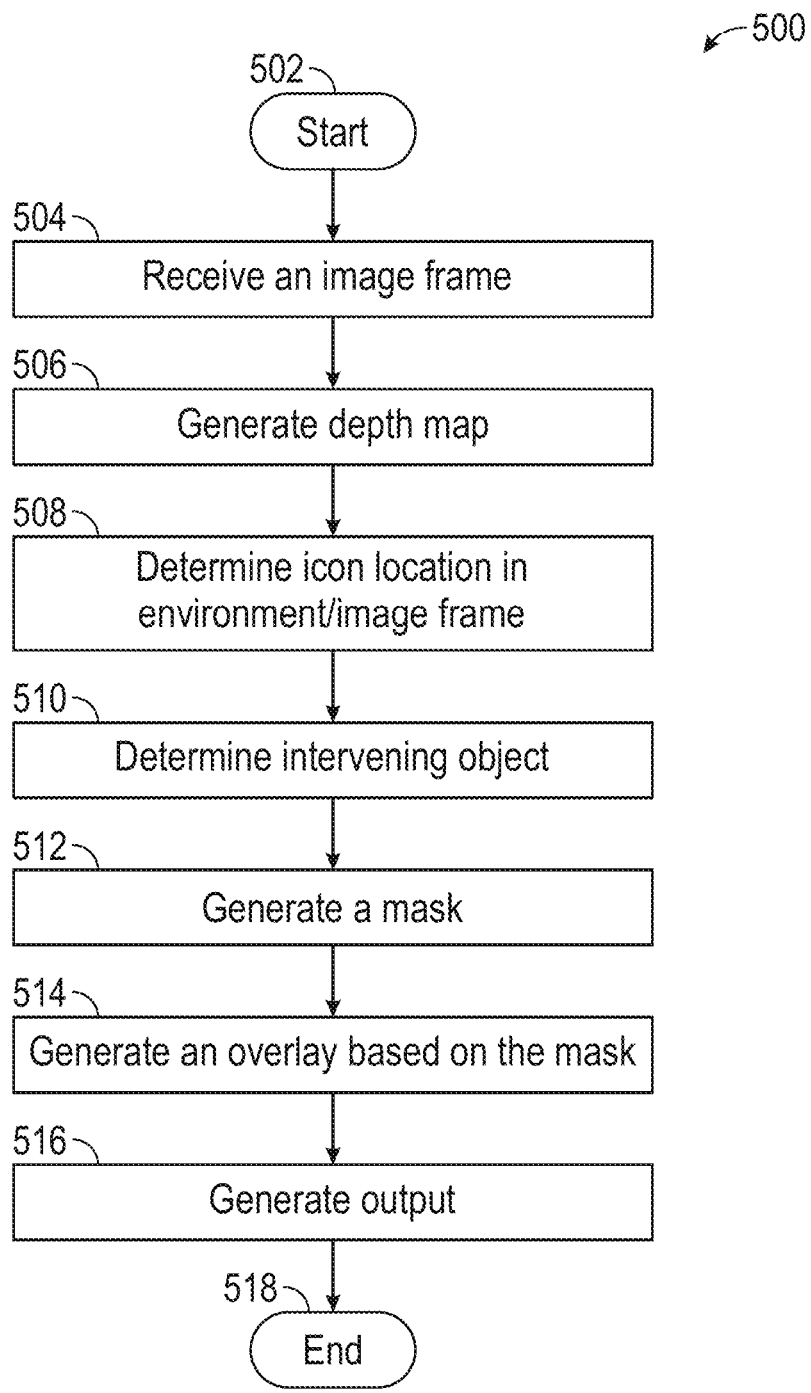
FIG. 5 illustrates a flowchart of a method of producing an image frame with an AR overlay with 3D occlusion of the AR elements in the overlay.

FIG. 5 illustrates a flowchart of a method 500 of producing an image frame with AR overlay with 3D occlusion of the AR elements. The method starts at step 502. At step 504, an image frame is received. The image frame can be a frame from a video stream or video feed made up of a plurality of such image frames. The image frames can be a projection of a three-dimensional, real-world environment, such as environment 104 into a two-dimensional image frame, such as image frame 304. In this manner, an image frame 304 includes a projection of an environment point into one or more pixels in the image frame. At step 506, a depth map of the image frame is generated. The depth map includes distances of the environment points to a user or to a camera of a user which captured the image 304. The depth map includes information such as pixels, or pixel coordinates and pixel distances, where the distances are distances of an environment point corresponding to the pixel to the user or the camera of the user which captured the image 304.

At step 508, icon location of a virtual reality icon in the environment is determined. In other words, the icon location corresponds to the coordinates of the icon pixels making up the virtual reality icon, if the virtual reality icon were to exist in the environment 104 as a real object. A variety of positioning data (e.g., GPS) can be used to determine the icon location of a virtual reality icon in the environment 104. For example, if the virtual reality icon corresponds to a restaurant, the icon location of the icon in the environment 104 can correspond to the GPS coordinates of the restaurant. The icon can be made up of a plurality of icon points, which when projected into the image frame 304 can yield icon pixel coordinates. Furthermore, the positioning location of the user or the camera of the user, relative to the icon location can be used to determine depth or icon distances of the icon points and/or the icon pixels. In terms of 3D occlusion, areas of the image frame 304 having intervening object pixels are used to occlude the virtual reality icon. The term icon is used to encompass AR elements generally. These AR elements can include, but are not limited to POI icons, navigation icons, indicators, carpets, routes, textboxes, guidance arrows and/or any AR graphical representation overlay on the image frame 304.

In step 510, the method includes determining intervening objects in the environment 104. The intervening objects can refer to objects, which would be closer to the user than the virtual reality icon, if the icon were to exist in the environment 104. Determining intervening objects can be implemented by comparing object pixel depths with icon distances. If an object pixel has a depth shorter than the icon distance and is in the same coordinates as the icon pixels, the object pixel is an intervening object pixel. The icon can be generated with the icon pixels at the coordinates of the intervening object pixels erased. In other words, in the area of overlap between intervening object pixels and the icon pixels, only the intervening object pixels are reflected in the output image with an AR overlay. The erasing of the overlapping intervening object pixels can be performed by implementing a mask. At step 512, a mask is generated based on intervening object pixels. The mask can be used to erase portions of the virtual reality icon overlapping the mask. The steps 508-512 can be repeated for other virtual reality icons that are to be placed in an AR overlay for the image frame 304. At step 514, an AR overlay is generated based on one or more masks for intervening objects between the user and the virtual reality icons that are to be placed in the image frame 304. Icon pixels having coordinates within the boundaries of an intervening object mask are erased. At step 516, the AR overlay is superimposed on the image frame 304 used to generate an output, for example to be displayed to the user. The method ends at step 518.

Figure 6A:
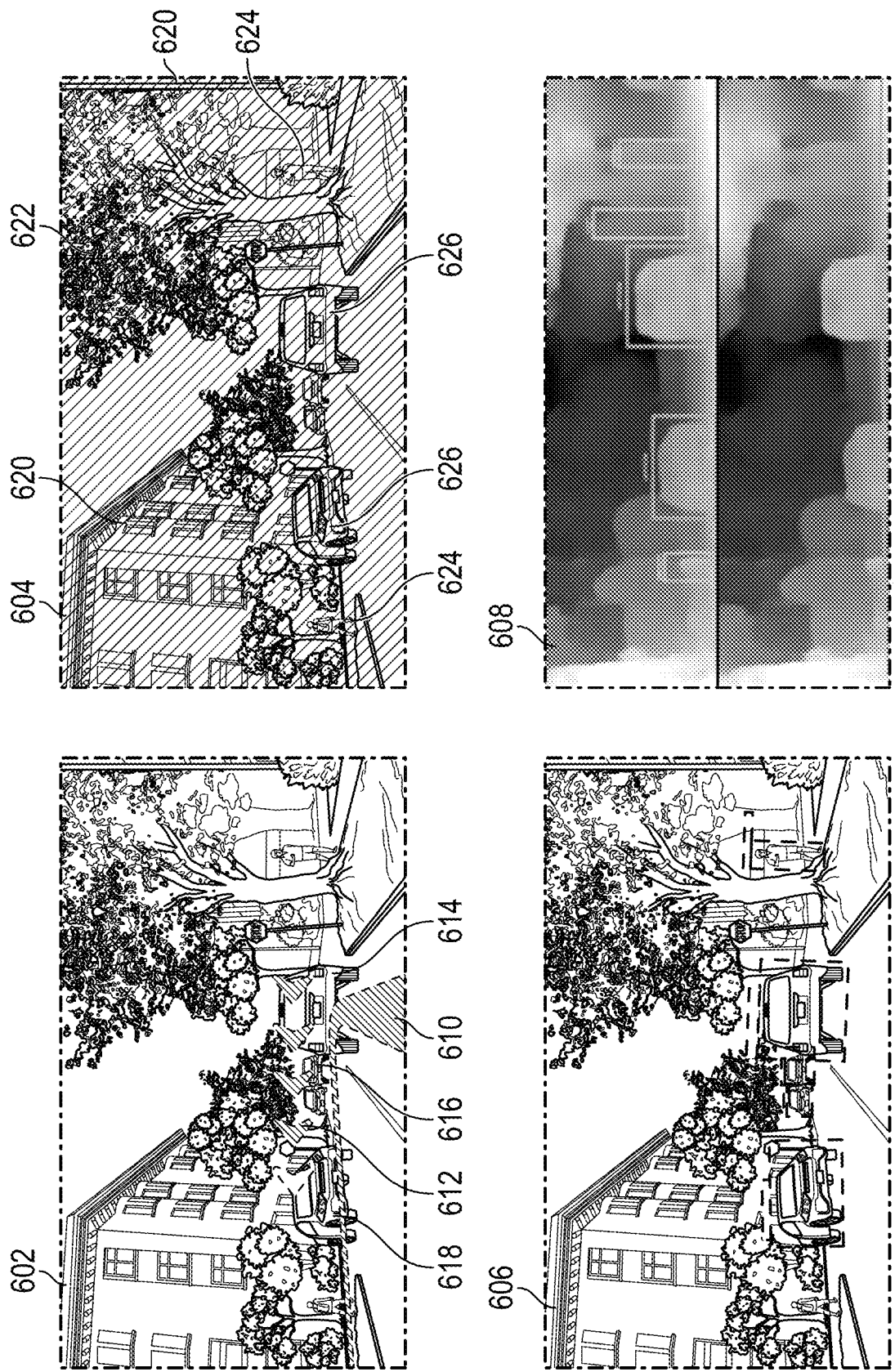
FIG. 6A illustrates examples of generating an AR overlay for an image frame.

FIG. 6A illustrates examples of generating an AR overlay for an image frame. The image frame 602 includes navigation AR elements, such as carpets 610 and navigation arrows 612. In the image frame 602, these AR elements are placed, without 3D occlusion. As a result, although the navigation guidance is placed in correct spots in the image frame, for a human user, they are less realistic. For example, the navigation carpet 610 is shown on top of the cars 614, 618. If the navigation carpet 610 was a physical object in the environment, the cars 614, 618 would be on top of the carpet 610. Similarly, if navigation arrows 612 were physical signposts in the environment, they would be in front of the cars 614, 616 and behind the car 618, relative to the vantage point of the viewer of the image 602. The described embodiments can be utilized to improve the placement of the AR elements in the image frame, for example by performing 3D occlusion when an intervening object is closer to the viewer than the AR element.

The image 604 illustrates an example output of an image segmentation module. Objects in the image 604 are labeled with a segment label. For example, label 620 corresponds to buildings. Label 622 corresponds to plants and trees. Label 624 corresponds to pedestrians and label 626 corresponds to vehicles. In some applications, the segmentation can include semantic segmentation, instance segmentation, and/or panoptic segmentation. If segmentation alone is used, in some instances, the placement of the AR elements can still be somewhat unrealistic or imprecise. For example, some segmentation output may group together vehicles that are very close together in an image. In the example shown, the vehicles 614 and 616 (as well as the parked vehicles near the vehicle 616) can be labeled together as "vehicle." In this scenario, if the AR element is to be placed in between these vehicles, the occlusion may be imprecise.

Figure 6B:
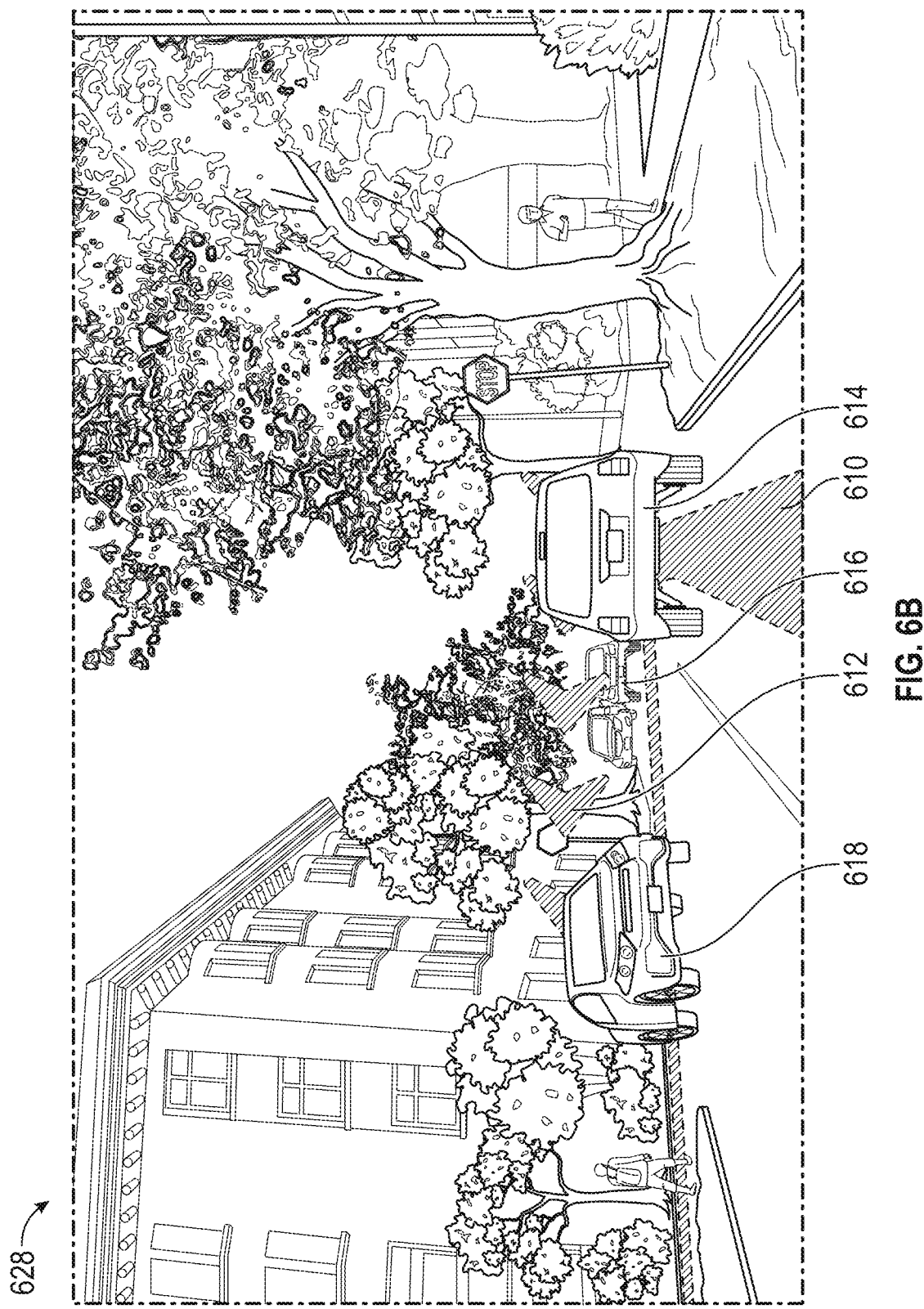
FIG. 6B illustrates an image with an AR overlay produced using 3D occlusion.

The image 606 illustrates an output of an object detection module for the same environment as images 602, 604. Object detection models can detect distinct objects in the image frame 606 and tag pixels within a detected object, with an object identifier, such as "vehicle_215," "vehicle_003," and similar object identifiers. The image 608 is a depth map of the same environment as shown in images 602, 604 and 606. The depth map information can be combined with image segmentation and object detection information to further refine the placement and occlusion of an AR element. For example, semantic segmentation can indicate a car over a navigation carpet 610. The navigation carpet 610 can then be accordingly occluded in a manner that appears a vehicle 614 is traveling over the navigation carpet 610. Similarly, segmentation and object detection information along with depth map information can indicate where the navigation arrows 612 are to be placed, relative to the vehicles 614 and 616, and which pixels of the navigation arrows 612 can be occluded for the AR overlay to appear realistic. FIG. 6B illustrates an image 628 of the same environment as shown in images 602, 604, 606 and 608 with an AR overlay produced using 3D occlusion. The vehicle 614 occludes the navigation carpet 610 and navigation arrows 612 in portions, where it overlaps them, but the vehicle 616 does not impact these AR elements because the vehicle 616 is at a further away distance to the use than these AR elements.

In some embodiments, the vehicle 614 is detected to be an intervening object, and its pixel coordinates are used to generate a mask. The mask is used to occlude the AR elements, navigation carpet 610 and navigation arrows 612 in overlapping areas. Similarly, the vehicle 618 is detected to be an intervening object for the navigation arrows 612. A mask based on pixel coordinates of the vehicle 618 is used to occlude the navigation arrows 612 in the image 628.

Figure 7:
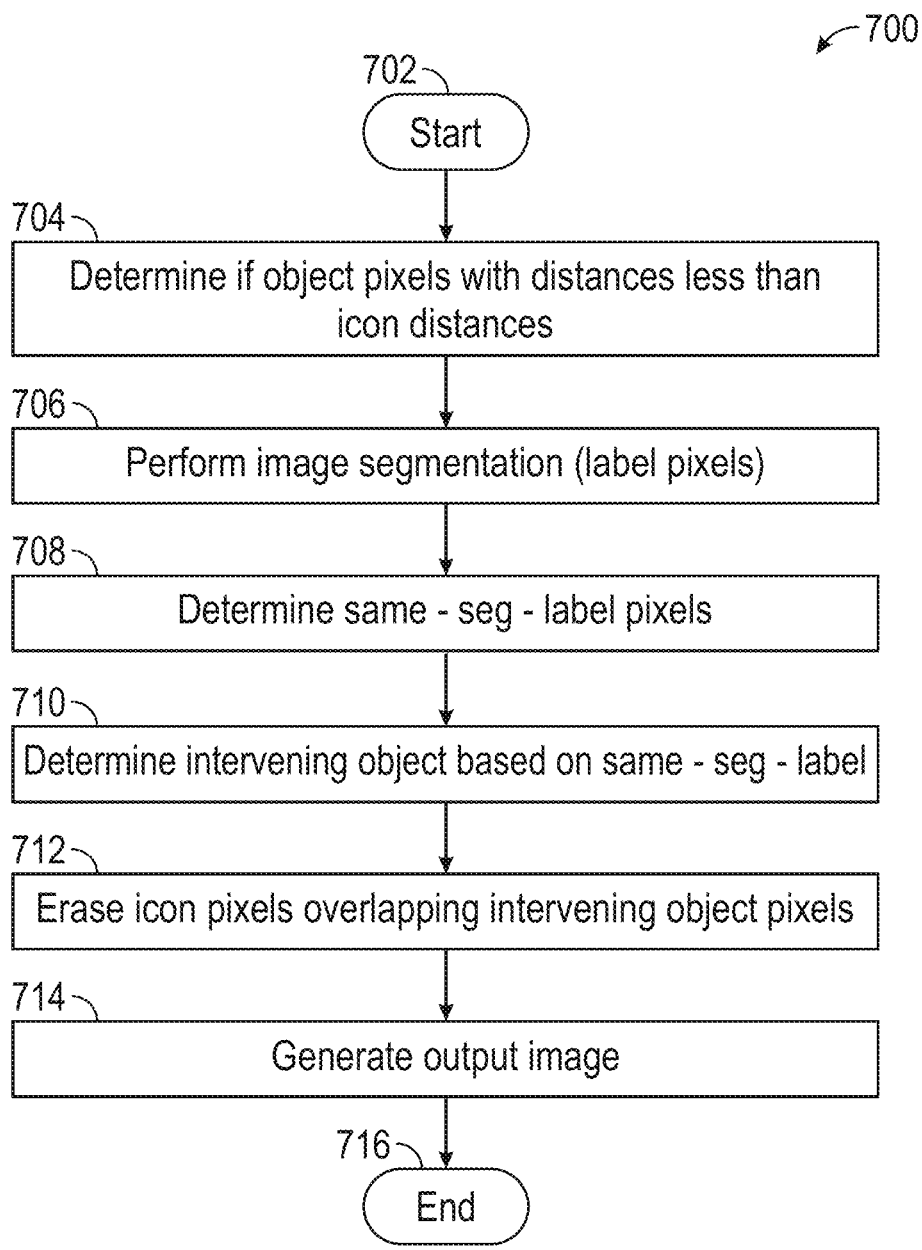
FIG. 7 illustrates a flowchart of a method of generating an output image with an AR overlay.

FIG. 7 illustrates a flowchart of a method 700 of generating an output image with AR overlay. The method starts at step 702. At step 704, the output of one or more object information models are used to determine object pixels that may be present in an image frame 304. Furthermore, icon pixels corresponding to virtual reality icons to be placed in the image frame 304 can be determined. Depth information for the icon pixels can be determined relative to the user or the camera which captured the image frame 304. If object pixels with distances (or depths) less than icon distances of an AR element are present, the object is likely an intervening object, which can be considered for 3D occlusion of the AR element. At step 706, image segmentation is performed, labeling pixels in an image frame 304 with a segment label. At step 608, same-segment-labeled pixels are determined. At step 710, more precise boundaries of the intervening objects are determined based on same-segment-labeled pixels. At step 712, the icon pixels overlapping with intervening object pixels are erased to generate a 3D occluded icon. At step 714, an output image is generated with an overlay by superimposing the 3D occluded icon generated at step 712 and any other AR elements on the image frame 304. In some embodiments, at step 704, a mask is generated based on determined intervening object pixels and the accuracy of the pixels belonging to the mask is further improved using steps 706-710. In this scenario, at step 712, the icon pixels having coordinates overlapping the intervening object mask are erased when generating the 3D occluded icon. The method ends at step 716.

Figure 8:
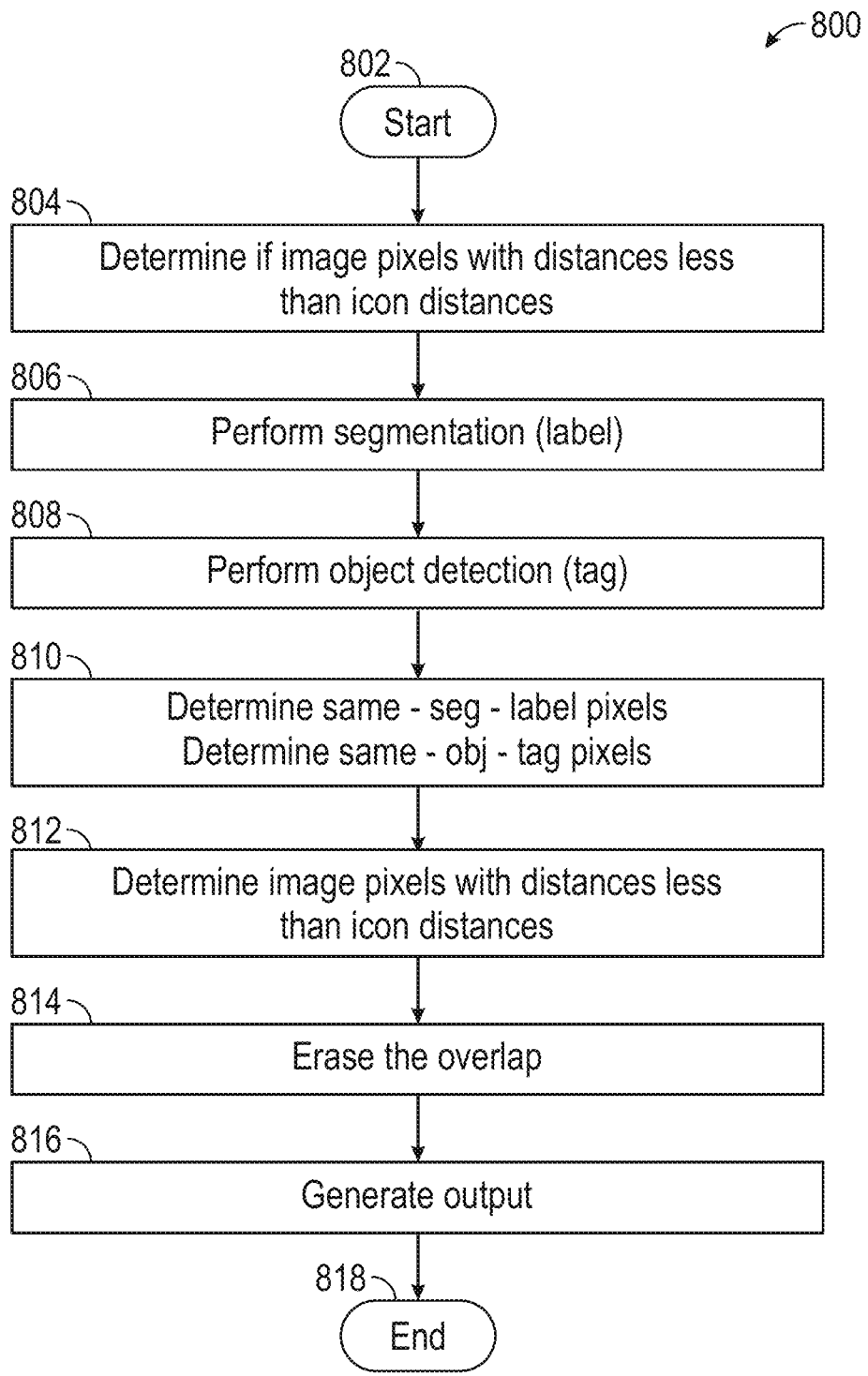
FIG. 8 illustrates a flowchart of a method of generating an output image with an AR overlay from an input image.

FIG. 8 illustrates a flowchart of a method 800 of generating an output image with AR overlay from an input image 304. The method starts at step 802. At step 804, image pixels with distances less than the icon pixels of the AR overlay are determined, using a depth map. As described earlier, depth maps can be imprecise, and depth distances for some pixels may be inaccurate at this stage. In some embodiments, the depth map data can be used to generate a preliminary mask for candidate intervening objects, where clusters of icon pixels having icon distances less than image pixel distances can make up an intervening object mask. At step 806, image segmentation is performed on the image frame 304. At step 808 object detection is performed on the image frame 304. At step 810, same-segment-labeled pixels and same-object-tagged pixels are determined. At step 812, the data obtained in step 810 is used to further improve the accuracy of determination of image pixels with distances larger than the icon pixels. In embodiments, where intervening object masks are used, the data from the step 810 can be used to improve the accuracy of the intervening object mask, which may have initially been generated based on a depth map. Alternatively, in other embodiments, no preliminary intervening object mask is generated and the combined data from a data map and the step 810 is used to generate an intervening object mask.

At step 814, the overlapping object pixel information (e.g., an intervening object mask) is used to erase icon pixels having an overlap with an intervening object and having icon distances more than the intervening object pixel distances. The step 814 produces a 3D-occluded icon, which can be incorporated into an AR overlay. At step 816, the AR overlay is superimposed on the image frame 304 to generate an output, which can be displayed to a user. The method ends at step 818.

Figure 9:
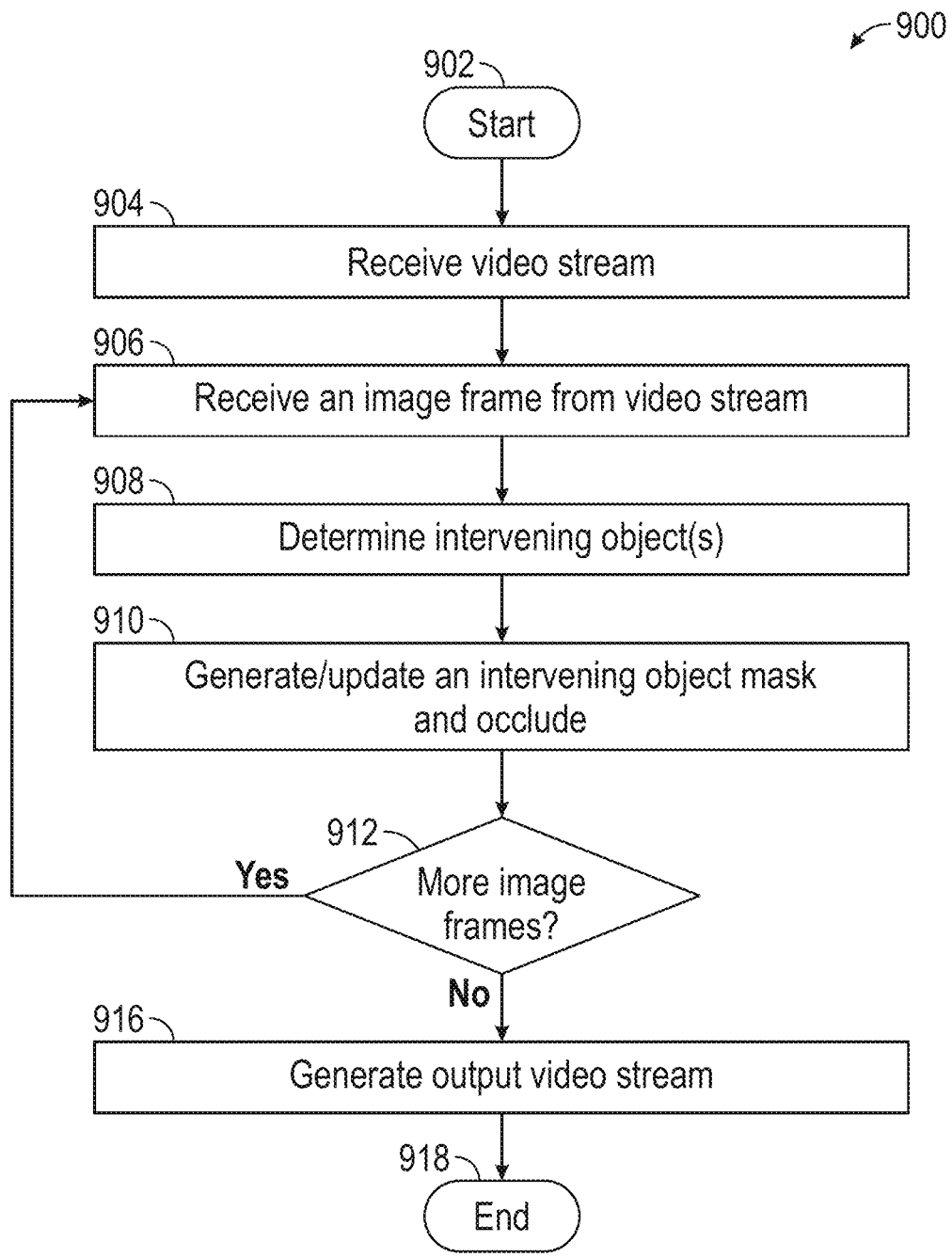
FIG. 9 illustrates a flowchart of a method of generating an augmented reality video output.

FIG. 9 illustrates a flowchart of a method 900 of generating an augmented reality video output. The method starts at step 902. At step 904, a video stream of an environment is received by an AR system. At step 906, an image frame from the video stream is received, and a preliminary AR overlay for the image frame can be generated. At step 908, intervening objects between the AR elements of the AR overlay and the objects in the image frame are determined by using the methods described above. At step 910, one or more intervening object masks are generated based on detecting image pixels having distances more than the AR element pixels in the AR overlay. AR element pixels overlapping the intervening object masks can be erased to generate 3D-occluded AR elements. The 3D-occluded AR elements and potentially other AR elements are superimposed on the image frame to generate an output image frame. At step 912, if more images are incoming from the video stream, the method can go back to the step 906 and repeat the steps 906-912, update the intervening object mask and generate additional output image frames. At step 914, the output image frames can be used to generate an output video stream and displayed to the user. The method ends at step 916.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
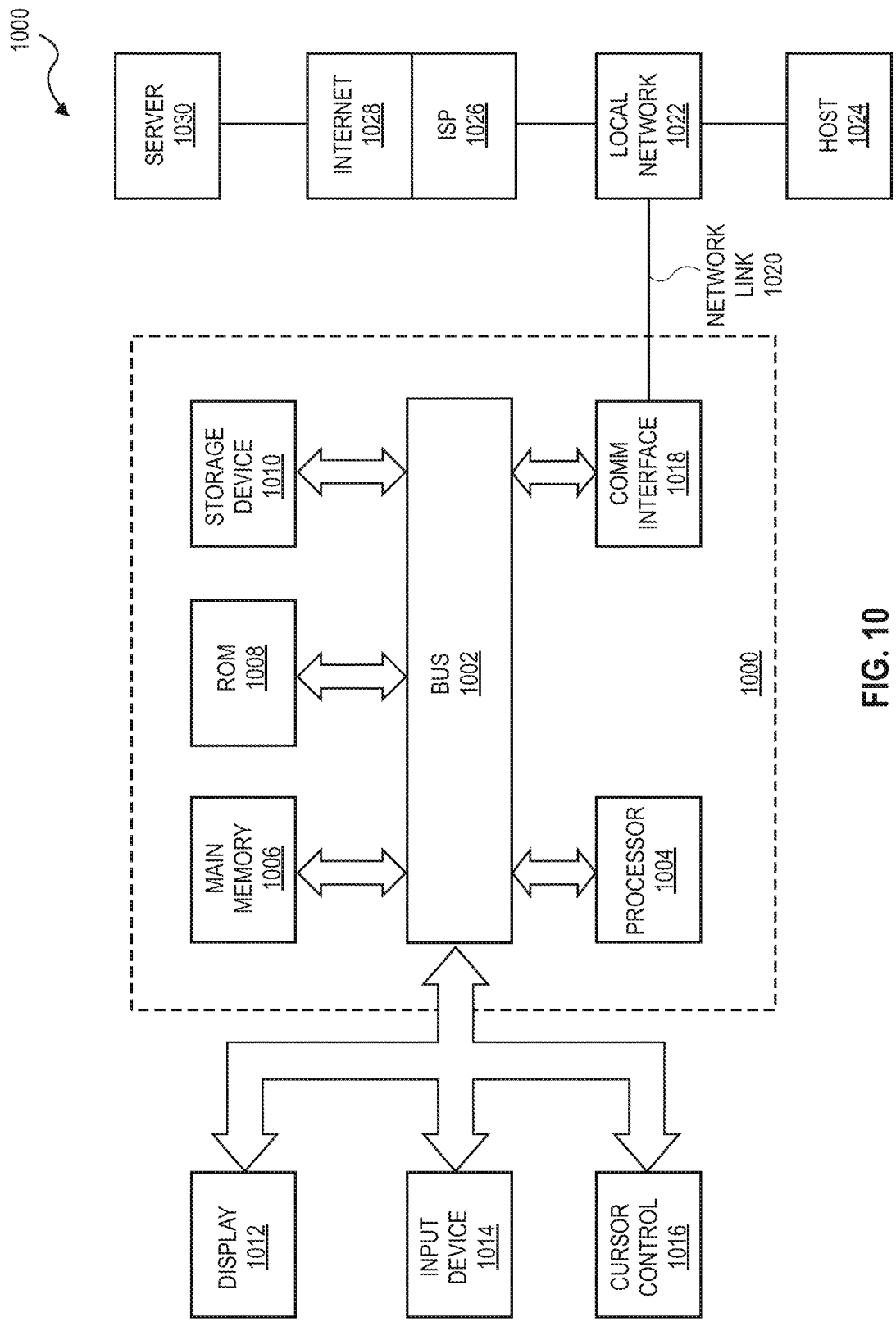
FIG. 10 is a block diagram that illustrates a computer system upon which one or more described embodiment can be implemented.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: receiving a video stream of an environment, the video stream comprising image frames, each image frame comprising a projection of an environment point into one or more pixels in the image frame; generating a depth map of an image frame, comprising distances of environment points to a user for pixels of the image frame, wherein the depth map comprises image pixels and pixel distances; determining icon location of a virtual reality icon in the environment, the icon comprising a plurality of icon points; determining icon pixel coordinates of the virtual reality icon in the image frame, based on a projection of the icon points into icon pixels in the image frame; determining icon distances of the plurality of the icon points from the user; detecting potential presence of an intervening object in the environment between the user and the icon location, based at least in part on the icon pixel coordinates, icon distances and the depth map; determining intervening object pixels, based at least in part on the depth map and output of one or more object information models; determining icon pixels overlapping the intervening object pixels; and generating the icon with the overlapping icon pixels erased.

Example 2: The method of Example 1, wherein detecting an intervening object comprises: determining whether the icon pixel coordinates are in an area of the image having pixel distances closer to the user than the icon distances.

Example 3: The method of some or all of Examples 1 and 2, wherein the object information models comprise artificial intelligence models, including semantic segmentation models and object detection models.

Example 4: The method of some or all of examples 1-3, wherein determining intervening object pixels comprise: performing image segmentation on the image frame, labeling image pixels with a segment label; determining image pixels having same segment labels; detecting same-segment-label pixels overlapping the icon pixels and having pixel distances less than the icon distances; and outputting the detected overlapping same-segment-label pixels as the intervening object pixels.

Example 5: The method of some or all of Examples 1-4, wherein determining intervening object pixels comprise: performing image segmentation on the image frame, labeling image pixels with a segment label; performing object detection on the image frame, tagging image pixels within an object box with an object tag; determining image pixels having same segment labels; determining same-segment-label pixels having same object tags; detecting same-segment-label, same-object-tag image pixels having pixel distances less than the icon distances; and outputting the detected same-segment-label, same-object-tag as the intervening object pixels.

Example 6: The method of some or all of Examples 1-5, further comprising: generating an output image frame comprising the image frame and the generated icon placed in the image frame at the icon pixel coordinates as an overlay; generating a plurality of output image frames; generating an output video stream from the plurality of output image frames.

Example 7: The method of some or all of Examples 1-6, further comprising: generating an intervening object mask based on the intervening object pixels and erasing icon pixels within the mask boundary; generating an output image frame based on the image frame and the generated icon placed in the image frame at the icon pixel coordinates; receiving a plurality of the image frames; updating the intervening object mask between each image frames and based on object and depth information in each image frame; generating a plurality of output image frames, at least in part by generating icons in each image frame based on the intervening object masks; and generating an output video stream from the plurality of the output image frames.

Example 8: A non-transitory computer storage that stores executable program instructions that, when executed by one or more computing devices, configure the one or more computing devices to perform operations comprising: receiving a video stream of an environment, the video stream comprising image frames, each image frame comprising a projection of an environment point into one or more pixels in the image frame; generating a depth map of an image frame, comprising distances of environment points to a user for pixels of the image frame, wherein the depth map comprises image pixels and pixel distances; determining icon location of a virtual reality icon in the environment, the icon comprising a plurality of icon points; determining icon pixel coordinates of the virtual reality icon in the image frame, based on a projection of the icon points into icon pixels in the image frame; determining icon distances of the plurality of the icon points from the user; detecting potential presence of an intervening object in the environment between the user and the icon location, based at least in part on the icon pixel coordinates, icon distances and the depth map; determining intervening object pixels, based at least in part on the depth map and output of one or more object information models; determining icon pixels overlapping the intervening object pixels; and generating the icon with the overlapping icon pixels erased.

Example 9: The non-transitory computer-storage of Example 8, wherein detecting an intervening object comprises: determining whether the icon pixel coordinates are in an area of the image having pixel distances closer to the user than the icon distances.

Example 10: The non-transitory computer-storage of some or all of Examples 8 and 9, wherein the object information models comprise artificial intelligence models, including semantic segmentation models and object detection models.

Example 11: The non-transitory computer-storage of some or all of Examples claim 8-10, wherein determining intervening object pixels comprise: performing image segmentation on the image frame, labeling image pixels with a segment label; determining image pixels having same segment labels; detecting same-segment-label pixels overlapping the icon pixels and having pixel distances less than the icon distances; and outputting the detected overlapping same-segment-label pixels as the intervening object pixels.

Example 12: The non-transitory computer-storage of some or all of Examples 8-11, wherein determining intervening object pixels comprise: performing image segmentation on the image frame, labeling image pixels with a segment label; performing object detection on the image frame, tagging image pixels within an object box with an object tag; determining image pixels having same segment labels; determining same-segment-label pixels having same object tags; detecting same-segment-label, same-object-tag image pixels having pixel distances less than the icon distances; and outputting the detected same-segment-label, same-object-tag as the intervening object pixels.

Example 13: The non-transitory computer-storage of some or all of Examples 8-12, wherein the operations further comprise: generating an output image frame comprising the image frame and the generated icon placed in the image frame at the icon pixel coordinates as an overlay; generating a plurality of output image frames; generating an output video stream from the plurality of output image frames.

Example 14: The non-transitory computer-storage of some or all of Examples 8-13, wherein the operations further comprise: generating an intervening object mask based on the intervening object pixels and erasing icon pixels within the mask boundary; generating an output image frame based on the image frame and the generated icon placed in the image frame at the icon pixel coordinates; receiving a plurality of the image frames; updating the intervening object mask between each image frames and based on object and depth information in each image frame; generating a plurality of output image frames, at least in part by generating icons in each image frame based on the intervening object masks; and generating an output video stream from the plurality of the output image frames.

Example 15: A system comprising a processor, the processor configured to perform operations comprising: receiving a video stream of an environment, the video stream comprising image frames, each image frame comprising a projection of an environment point into one or more pixels in the image frame; generating a depth map of an image frame, comprising distances of environment points to a user for pixels of the image frame, wherein the depth map comprises image pixels and pixel distances; determining icon location of a virtual reality icon in the environment, the icon comprising a plurality of icon points; determining icon pixel coordinates of the virtual reality icon in the image frame, based on a projection of the icon points into icon pixels in the image frame; determining icon distances of the plurality of the icon points from the user; detecting potential presence of an intervening object in the environment between the user and the icon location, based at least in part on the icon pixel coordinates, icon distances and the depth map; determining intervening object pixels, based at least in part on the depth map and output of one or more object information models; determining icon pixels overlapping the intervening object pixels; and generating the icon with the overlapping icon pixels erased.

Example 16: The system of Example 15, wherein detecting an intervening object comprises: determining whether the icon pixel coordinates are in an area of the image having pixel distances closer to the user than the icon distances.

Example 17: The system of some or all of Examples 15 and 16, wherein the object information models comprise artificial intelligence models, including semantic segmentation models and object detection models.

Example 18: The system of some or all of Examples 15-17, wherein determining intervening object pixels comprise: performing image segmentation on the image frame, labeling image pixels with a segment label; determining image pixels having same segment labels; detecting same-segment-label pixels overlapping the icon pixels and having pixel distances less than the icon distances; and outputting the detected overlapping same-segment-label pixels as the intervening object pixels.

Example 19: The system of some or all of Examples 15-18, wherein determining intervening object pixels comprise: performing image segmentation on the image frame, labeling image pixels with a segment label; performing object detection on the image frame, tagging image pixels within an object box with an object tag; determining image pixels having same segment labels; determining same-segment-label pixels having same object tags; detecting same-segment-label, same-object-tag image pixels having pixel distances less than the icon distances; and outputting the detected same-segment-label, same-object-tag as the intervening object pixels.

Example 20: The system of some or all of Examples 15-19, wherein the operations further comprise: generating an output image frame comprising the image frame and the generated icon placed in the image frame at the icon pixel coordinates as an overlay; generating a plurality of output image frames; generating an output video stream from the plurality of output image frames.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
   receiving, by one or more processors of a computing device, a video stream of an environment, the video stream including a plurality of image frames, each respective image frame from the plurality of image frames including a projection of an environment point into one or more pixels of the respective image frame;
   generating, by the one or more processors, a depth map of the image frame, the depth map including respective comprising distances of environment points to a user for each of the image pixels of the image frame;
   determining, by the one or more processors, icon location of a virtual reality icon in the environment, the icon including a plurality of icon points;
   determining, by the one or more processors, icon pixel coordinates of the virtual reality icon in the image frame based on a projection of the icon points into icon pixels in the image frame;
   determining, by the one or more processors, icon distances of the plurality of the icon points from the user;
   detecting, by the one or more processors, potential presence of an intervening object in the environment between the user and the icon location, based at least in part on the icon pixel coordinates, icon distances and the depth map;
   performing, using an image segmentation module executed by the one or more processors, image segmentation on an image frame from the plurality of image frames;
   labeling, by the one or more processors, each of the image pixels of the image frame with a corresponding segment label;
   identifying, by the one or more processors, image pixels of the image frame having same corresponding segment labels as same-segment-label pixels;
   determining, by the one or more processors, intervening object pixels, based at least in part on the depth map and the same-segment-label pixels overlapping the icon pixels and having pixel distances less than the icon distances;
   determining, by the one or more processors, icon pixels overlapping the intervening object pixels;
   generating, by the one or more processors, the icon with the overlapping icon pixels erased;
   generating, by the one or more processors, an output image frame based on the image frame, the icon, and the overlapping same-segment-label pixels; and
   outputting, by the one or more processors and for display, the output image frame.

2. The method of claim 1, wherein detecting an intervening object comprises:
   determining whether the icon pixel coordinates are in an area of the image having pixel distances closer to the user than the icon distances.

3. The method of claim 1, wherein determining intervening object pixels comprise:
   performing object detection on the image frame, tagging image pixels within an object box with an object tag;
   determining the same-segment-label pixels having same object tags as same-segment label, same-object-tag image pixels; and
   detecting same-segment-label, same-object-tag image pixels having pixel distances less than the icon distances as the intervening object pixels.

4. The method of claim 1, further comprising:
   generating a plurality of output image frames; and
   generating an output video stream from the plurality of output image frames.

5. The method of claim 1, wherein the plurality of image frames is a first plurality of image frames, the method further comprising:
   generating an intervening object mask based on the intervening object pixels;
   erasing icon pixels within a boundary of the intervening object mask;
   generating the output image frame based on the image frame and the generated icon placed in the image frame at the icon pixel coordinates;
   receiving a second plurality of image frames;
   updating the intervening object mask between each image frame from the second plurality of image frames based on object and depth information in each image frame from the second plurality of image frames;
   generating a plurality of output image frames, at least in part by generating icons in each image frame based on the intervening object masks; and
   generating an output video stream from the plurality of the output image frames.

6. A non-transitory computer storage that stores executable program instructions that, when executed by one or more computing devices, configure the one or more computing devices to:
   receive a video stream of an environment, the video stream including a plurality of image frames, each image frame comprising a projection of an environment point into one or more pixels in the image frame;
   generate a depth map of the image frame, the depth map including respective distances of environment points to a user for each of the image pixels of the image frame;
   determine icon location of a virtual reality icon in the environment, the icon including a plurality of icon points;
   determine icon pixel coordinates of the virtual reality icon in the image frame, based on a projection of the icon points into icon pixels in the image frame;
   determine icon distances of the plurality of the icon points from the user;
   detect potential presence of an intervening object in the environment between the user and the icon location, based at least in part on the icon pixel coordinates, icon distances and the depth map;
   perform image segmentation on an image frame from the plurality of image frames;
   label each of the image pixels of the image frame with a corresponding segment label;
   identify image pixels of the image frame having same corresponding segment labels as same-segment-label pixels;
   determine intervening object pixels, based at least in part on the depth map and the same-segment-label pixels overlapping the icon pixels and having pixel distances less than the icon distances;
   determine icon pixels overlapping the intervening object pixels;
   generate the icon with the overlapping icon pixels erased
   generate an output image frame based on the image frame, the icon, and the overlapping same-segment-label pixels; and
   output the output image frame.

7. The non-transitory computer storage of claim 6, wherein the instructions that configure the one or more computing devices to detect an intervening object comprise instructions that cause the one or more computing devices to:
   determine whether the icon pixel coordinates are in an area of the image having pixel distances closer to the user than the icon distances.

8. The non-transitory computer storage of claim 6, wherein the instructions that configure the one or more computing devices to determine intervening object pixels comprise instructions that cause the one or more computing devices to:
   perform object detection on the image frame, tagging image pixels within an object box with an object tag;
   determine the same-segment-label pixels having same object tags as same-segment label, same-object-tag image pixels; and
   detect same-segment-label, same-object-tag image pixels having pixel distances less than the icon distances as the intervening object pixels.

9. The non-transitory computer storage of claim 6, wherein the instructions further cause the one or more computing devices to:
   generate a plurality of output image frames; and
   generate an output video stream from the plurality of output image frames.

10. The non-transitory computer storage of claim 6, wherein the instructions further cause the one or more computing devices to:
   generate an intervening object mask based on the intervening object pixels;
   erase icon pixels within a boundary of the mask;
   generate the output image frame based on the image frame and the generated icon placed in the image frame at the icon pixel coordinates;
   receive a second plurality of image frames;
   update the intervening object mask between each image frame from the second plurality of image frames based on object and depth information in each image frame from the second plurality of image frames;
   generate a plurality of output image frames, at least in part by generating icons in each image frame based on the intervening object masks; and
   generate an output video stream from the plurality of the output image frames.

11. A system comprising:
   a processor; and
   a storage device configured to store instructions that, when executed by the processor, cause the processor to:
      receive a video stream of an environment, the video stream including a plurality of image frames, each image frame comprising a projection of an environment point into one or more pixels in the image frame;
      generate a depth map of the image frame, the depth map including respective distances of environment points to a user for each of the image pixels of the image frame;
      determine icon location of a virtual reality icon in the environment, the icon including a plurality of icon points;
      determine icon pixel coordinates of the virtual reality icon in the image frame, based on a projection of the icon points into icon pixels in the image frame;
      determine icon distances of the plurality of the icon points from the user;
      detect potential presence of an intervening object in the environment between the user and the icon location, based at least in part on the icon pixel coordinates, icon distances and the depth map;

perform image segmentation on an image frame from the plurality of image frames;
label each of the image pixels of the image frame with a corresponding segment label;
identify image pixels of the image frame having same corresponding segment labels as same-segment-label pixels;
determine intervening object pixels, based at least in part on the depth map and the same-segment-label pixels overlapping the icon pixels and having pixel distances less than the icon distances;
determine icon pixels overlapping the intervening object pixels;
generate the icon with the overlapping icon pixels erased
generate an output image frame based on the image frame, the icon, and the overlapping same-segment-label pixels; and
output the output image frame.

12. The system of claim 11, wherein the instructions that cause the processor to detect an intervening object comprise instructions that cause the processor to:
determine whether the icon pixel coordinates are in an area of the image having pixel distances closer to the user than the icon distances.

13. The system of claim 11, wherein the instructions that cause the processor to determine intervening object pixels comprise instructions that cause the processor to:
perform object detection on the image frame, tagging image pixels within an object box with an object tag;
determine the same-segment-label pixels having same object tags as same-segment label, same-object-tag image pixels; and
detect same-segment-label, same-object-tag image pixels having pixel distances less than the icon distances as the intervening object pixels.

14. The system of claim 11, wherein the instructions further cause the processor to:
generate a plurality of output image frames; and
generate an output video stream from the plurality of output image frames.

15. The system of claim 11, wherein the instructions further cause the processor to:
generate an intervening object mask based on the intervening object pixels;
erase icon pixels within a boundary of the mask;
generate the output image frame based on the image frame and the generated icon placed in the image frame at the icon pixel coordinates;
receive a second plurality of image frames;
update the intervening object mask between each image frame from the second plurality of image frames based on object and depth information in each image frame from the second plurality of image frames;
generate a plurality of output image frames, at least in part by generating icons in each image frame based on the intervening object masks; and
generate an output video stream from the plurality of the output image frames.

* * * * *